United States Patent Office 2,775,569
Patented Dec. 25, 1956

2,775,569

DISPERSION OF FLUOROCHLOROCARBON POLYMERS

Charles D. Dipner, Jersey City, Wilber O. Teeters, River Edge, and John M. Wrightson, North Bergen, N. J., assignors to The M. W. Kellogg Company, Jersey City, N. J., a corporation of Delaware No Drawing. Application December 30, 1949,
Serial No. 136,168

17 Claims. (Cl. 260—32.8)

This invention relates to dispersions of high molecular weight polymers of perfluorochlorocarbons as the monomers. In one aspect this invention relates to dispersions or suspensions of the normally waxy and plastic polymers of the single monomer trifluorochloroethylene. In another aspect the invention relates to a method for applying plastic polymers of trifluorochloroethylene to surfaces.

Polymers of trifluorochloroethylene possess certain physical and chemical characteristics which make the polymers particularly desirable as surface coatings and impregnants. The plastic polymer produced from the single monomer trifluorochloroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four-fifths of the weight of the polymer of the single monomer is made of the two halogens, fluorine and chlorine. The quick quenched plastic polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The plastic polymer is flexible and resilient, has a high impact strength at low temperatures and is resistant to thermal shock. The polymer is not wetted by water and is unaffected by high humidity. Table I below shows some of the electrical characteristics of the normally solid polymer under high frequency:

TABLE I

Solid polymer of trifluorochloroethylene

| Electrical Frequency cycles/sec. | Dielectric Constant E | Dielectric Power Loss, Tan | |
|---|---|---|---|
| $1 \times 10^2$ | 2.72 | 0.022 | 0.0011 |
| $1 \times 10^3$ | 2.63 | 0.27 | 0.0014 |
| $1 \times 10^4$ | 2.53 | 0.023 | 0.0012 |
| $1 \times 10^5$ | 2.46 | 0.0135 | 0.0008 |
| $1 \times 10^6$ | 2.43 | 0.0082 | 0.0004 |
| $1 \times 10^7$ | 2.35 | 0.0060 | 0.0003 |
| $1 \times 10^8$ | 2.30 | 0.0028 | 0.0002 |
| $3 \times 10^8$ | 2.30 | 0.0030 | |
| $3 \times 10^9$ | 2.30 | 0.0028 | 0.0002 |
| $1 \times 10^{10}$ | 2.29 | 0.0039 | 0.0002 |
| $2.5 \times 10^{10}$ | 2.29 | 0.0055 | |

Other physical properties of the plastic polymer are shown below in Table II:

TABLE II

| Property | Test Result |
|---|---|
| Specific gravity | 2.1. |
| Tensile strength at 86° F., p. s. i | 9,400. |
| Elongation at break 86° F., percent | 127. |
| Coefficient of linear expansion (−320° F. to 167° F.) | $3.5 \times 10^{-5}$. |
| Specific resistance, ohms | $5 \times 10^{17}$. |
| Water absorption, percent | 0.00. |
| Outdoor weathering | no detectable change. |

Normally solid polymers produced from the single monomer trifluorochloroethylene may be prepared by polymerizing the monomer in the presence of a suitable organic peroxide such as bistrichloroacetyl peroxide, as the polymerizing agent, at a temperature between about −20 and about 25° C., preferably at a temperature of about −16° C. At a temperature of −16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

To distinguish the plastic polymer over the oils and waxes produced with the same monomer, the polymer is described by reference to its no strength temperature. A no strength temperature (N. S. T.) of between about 210 and about 350° C. is characteristic of a normally solid polymer of the above preparation having plastic characteristics. Best plastic characteristics of the normally solid polymer are observed at N. S. T. values between about 240 and about 340° C. The N. S. T. values of the polymer depend upon such factors as temperature, residence time, concentration of promoter, pressure, etc. Since this invention does not relate to the method of producing the polymer of particular characteristics, further discussion thereof will not be undertaken. Other applications have been filed relating to the preparation of the polymer per se.

The no strength temperature (N. S. T.) is determined in the following manner: A sample of polytrifluorochloroethylene is hot pressed into a 1/16" thick sheet and cut into a strip of 1/8" x 1/16" x 1 5/8". The strip is notched 5/8" from the top so that the dimension at the notch shall be 1/16" x 1/16". A fine wire and a standard weight is attached to one end of the strip. The weight of the polymer plus the wire and standard weight shall equal 1/2 gram. The strip is then attached in a furnace and fixed vertically therein. The temperature of the sample is increased at a rate of about 1 1/2° C. per minute in the furnace as the breaking temperature is approached. The no strength temperature is the breaking temperature of the sample. Differences of about 5° C. are considered significant.

As a result of the excellent chemical and physical properties of the polymers of trifluorochloroethylene, the polymers have use as coatings on various surfaces in order to make such surfaces corrosion resistant to chemicals. The good electrical, non-wetting and flame resistant properties of the polymer also makes its use feasible as insulating coatings on electrical conductors, condensers and various parts used in electrical apparatus and circuits. The polymer may be applied to various surfaces, including flat and curved surfaces, wires, fabrics, yarn, paper, leather, cables, cans, glass, wood, etc. The polymer may be applied to metal wires, particularly aluminum, iron and copper, to act as an insulator on the surface of the wires. The coating of fabrics with polytrifluorochloroethylene renders the fabrics fire proof and shrink resistant and increases the strength of the fabrics. Heretofore the normally solid polymer has been applied to the surface by melting the polymer and applying it to the surface, such as by extrusion, or by dissolving the solid polymer in a suitable solvent, coating the surface with the solvent and subsequently evaporating the solvent. Applying the solid polymer by extrusion to the surfaces has certain obvious disadvantages. One of these disadvantages is the fact that relatively high temperatures must be employed and at such high temperatures there is a tendency for the polymer to decompose. The decomposition of the polymer not only affects its chemical and physical characteristics, but also the products of decomposition may attack the surface which is being coated.

It is also difficult to obtain thin films upon the surface when applying the polymer by extrusion, the use of thin films being highly desirable in coating wires used, for example, as armatures of motors. The solution method of application also has certain disadvantages. The substantial insolubility of the polymer in most solvents and its high viscosity with low solids content in other solvents makes this method somewhat impractical. Those solvents which have been found useful for dissolving plastic polytrifluorochloroethylene are relatively expensive which necessitates their recovery after evaporation. The solvents may also be corrosive to the surface being coated at the condition of application. The relatively high viscosity of solutions of plastic polytrifluorochloroethylene also makes their application difficult and the solutions must usually be applied at substantially elevated temperatures.

It is the object of this invention to form stable dispersions or suspensions of normally solid polymers of trifluorochloroethylene.

Another object of this invention is to provide a method for applying plastic polymers of trifluorochloroethylene of modified characteristics to surfaces.

Still another object of this invention is to provide a method and material for dispersing and plasticizing the plastic polymer of trifluorochloroethylene in such a form that the dispersion may be applied to surfaces with a minimum of application difficulties.

Another object of this invention is to provide a dispersion of plastic polymer of trifluorochloroethylene and a plasticizer in high concentrations and low viscosities in a liquid medium.

Various other objects and advantages of the present invention will become apparent to those skilled in the art.

Accordingly, finely-divided plastic polymer of trifluorochloroethylene is directly dispersed or suspended in a liquid medium. Suitable dispersants are the aliphatic and aromatic esters, the ether alcohols, and the ketones, having at least 3 carbon atoms per molecule and having a surface tension of at least about 23 dynes/cm.$^2$ at 20° C. Suitable ketones, useful as dispersants, comprise methyl isobutyl ketone, methyl ethyl ketone, di-isobutyl ketone, isophorone and cyclohexanone. Suitable ether alcohols, useful as dispersants, comprise the monoether alcohols such as methoxy ethanol, ethoxy ethanol, butoxy ethanol and the di-ether alcohols such as ethoxy ethoxy ethanol. Suitable esters, useful as dispersants, comprise methyl acetate, ethyl acetate, butyl acetate, ethyl propionate, amyl acetate and ethyl benzoate. The concentration of plastic polymer in the liquid medium ranges between about 10 and about 30 percent by weight usually in a particle size of about 0.1 to about 10 microns. In addition to the dispersant, the liquid medium preferably includes a diluent. The preferred diluent is an aromatic hydrocarbon, such as xylene, toluene, or benzene. Hydrocarbon fractions containing a relatively large amount of aromatic hydrocarbons are also suitable as the preferred diluent, such fractions being naphthas and petroleum distillates. Although the aromatic compounds are much preferred as diluents to be employed together with the dispersant as the liquid suspending medium, certain other compounds may be employed as diluents. These other compounds include the aliphatic alcohols having two or more carbon atoms per molecule, unsubstituted ethers such as dibutyl ether, and relatively high boiling hydrocarbon fractions. Mixtures of alcohol and water in a volume ratio of about 1:1 to about 1:5 have been found suitable as diluents for the dispersant. The weight ratio of dispersant to diluent is in the range of about 1:2 to about 1:25, preferably in the range of about 1:2 to 1:10. The preferred dispersing medium consists essentially of di-isobutyl ketone and xylene in a weight ratio of about 1:4.

A dispersion of the plastic in an aromatic hydrocarbon, such as xylene, may be made without the use of a dispersant. The aromatic hydrocarbon has a tendency to swell the plastic much like the dispersants. That amount of the aromatic hydrocarbon which swells the plastic may be regarded as the dispersant and the excess as the diluent. Dispersions made with an aromatic hydrocarbon alone, however, are generally not as good as those made with the above dispersants.

According to this invention it has been found desirable in making up the dispersion or suspension of the plastic to include a suitable plasticizer for the plastic trifluorochloroethylene polymer. In this manner the ultimate film obtained is more resilient and pliant, with less tendency for the film to tear or scratch. The use of a plasticizer also prevents crystallization of the plastic film with age. Such plasticizers comprise normally liquid and waxy polymers of trifluorochloroethylene. The liquid and wax polymers of trifluorochloroethylene are produced in a similar manner as described with regard to the production of normally solid polymers of trifluorochloroethylene. In general, the wax and liquid polymers are obtained at higher temperatures and with greater concentrations of promoter, usually with a chain transfer solvent, than employed in the manufacture of plastic polymers. Other plasticizers which may be incorporated with the dispersing medium comprise dioctyl phthalate and tricresyl phosphate. The plasticizers are incorporated in the dispersing medium in substantially the same amount as the polymer, usually in the range of about 10 to 25 weight percent of the dispersing medium.

According to this invention, films of 0.1 to 5 mils in thickness of normally solid polymer of trifluorochloroethylene may be applied to metal surfaces or the like. The normally solid polymer of trifluorochloroethylene is ground in a mill to a sufficient extent that the powdered polymer passes an 80 mesh screen. Thereafter, the powdered polymer is mixed with the dispersing medium of the composition as previously described. Generally, the solid polymer is incorporated in the dispersing medium initially in an amount not over 17 weight percent. The mixture of solid polymer and liquid dispersing medium is then introduced into a ball mill or pebble mill for further grinding. The grinding is continued for a period of at least twenty-four hours and thereafter an increased amount of solid polymer is introduced into the mixture during ball milling to bring the concentration of solid polymer to about 20 to 30 weight percent. The ball milling is continued for another period of at least twenty-four hours. Generally, the ball milling operation is effected over a period of about four to about eight days. Any method of grinding and pulverizing the powdered polymer may be employed without departing from the scope of this invention. Roller mills, colloid mills, gear pumps, and other conventional devices may be employed. After a sufficient length of ball milling, the mixture contains finely dispersed solid polymer of about 1 micron in diameter which does not settle upon prolonged standing and has a viscosity of about 90 to 130 centipoises at room temperature.

After the dispersion of plastic of the desired concentration has been made, preferably the plasticizer is then added to the dispersion to impart the modified characteristics to the dispersion. The plasticizer is substantially all dissolved in the dispersing medium. It is important to dissolve the plasticizer in the dispersing medium after the plastic has been dispersed since the presence of the plasticizer during milling makes the pulverization of the plastic into small particles difficult. Although the above procedure for incorporating the plasticizer in the dispersion is preferred, the plasticizer may be added prior to milling, as disclosed in the examples, without departing from the scope of this invention.

Articles may be coated by dipping the liquid into the above mixture and air drying. A coating of not more than about one mil in thickness can be obtained by a single dip. Usually, two, three or more dips, with air drying between dips, are required to obtain the desired film thickness upon the surface of the article. After the last dip the surface containing the deposited solid plasticized polymer thereon is heated to a temperature of about 200° C. or higher, depending on the amount and type of plasticizer employed, for from 30 seconds to 25 minutes to cause fusion and sintering of the solid powdered particles of polymer. Shorter periods of time within the above range are permissible with higher temperatures of fusion. The lower temperatures of fusion are preferred since the tendency of the polymer to decompose and attack metal surfaces is minimized. If insufficient film thickness is obtained after about four applications followed by fusion, the entire procedure may be repeated until the desired film thickness is obtained. Other methods of application include spraying and painting. On rigid metal surfaces, it may be desirable to lower the temperature following fusion at a slow rate, giving better adhesion. On the other hand, when flexibility and toughness are required, a quick quench of the fused film will be necessary to obtain an essentially amorphous polymer.

Fillers may be added to the completed dispersion with gentle stirring or by addition prior to the grinding operation in the pebble mill. Examples of stable fillers are calcium silicate, calcium carbonate, carbon black, titanium dioxide, etc., with particle dimensions of approximately 0.5 micron in diameter. Pigments such as the phthalocyanines and chrome green can also be incorporated in the polytrifluorochloroethylene dispersions.

The following examples are offered as a better understanding of the invention and should not be construed as unnecessarily limiting thereto.

EXAMPLE I

About 45 grams of 314 N. S. T. polytrifluorochloroethylene plastic (through 80 mesh screen) was added with stirring to a liquid dispersing medium containing 71 grams of di-isobutyl ketone and 156 grams of xylene. The suspension was poured into a one quart pebble mill containing 450 cc. of flint pebbles and rotated at approximately 75 R. P. M. for 85 hours. This dispersion, containing 16.5 percent plastic, flowed readily and gave complete visual coverage of a metal or glass surface whether applied by spraying, dipping, or drawing on the object coated. The dispersion dries to a white powdery material which forms a continuous film when heated to a temperature of 390° C. to 415° C. for fifteen seconds. After two or three applications, a continuous coating providing excellent chemical resistance to glass and good electrical insulation to metal is obtained.

EXAMPLE II

About 42 grams of 314 N. S. T. polytrifluorochloroethylene plastic (through 80 mesh screen) was added to a liquid dispersing medium containing 30 grams of liquid chlorotrifluoroethylene polymer, 41 grams of di-isobutyl ketone and 156 grams of xylene. This suspension was added to a quart size pebble mill containing 450 cc. of flint pebbles and rotated at approximately 110 R. P. M. for about sixty-nine hours. The dispersion exhibited the properties as described in Example I with the exception that a fusion temperature of 380° C. to 400° C. is used to produce a continuous film.

EXAMPLE III

About 42 grams of 314 N. S. T. polytrifluorochloroethylene plastic (through 80 mesh screen) was added with stirring to a liquid dispersion medium consisting of 30 grams of liquid chlorotrifluoroethylene polymer, 41 grams of di-isobutyl ketone, and 156 grams of xylene. This suspension was added to a quart size ball-mill containing 500 cc. of stainless steel balls and rotated at approximately 60 R. P. M. for 135.5 hours. To this excellent dispersion was added 6 grams of 314 N. S. T. polytrifluorochloroethylene plastic and the material milled at the same rate for an additional 63.5 hours. The dispersion dries to a white powdery material which forms a continuous film when heated to 380° C. to 400° C. for fifteen seconds. After two or three applications, a continuous coating providing excellent chemical resistance to glass and good electrical insulation to metal is obtained.

EXAMPLE IV 45 grams of 314 N. S. T. polytrifluorochloroethylene plastic (through 80 mesh screen) was covered with 100 grams of di-isobutyl ketone and allowed to stand for one week. The ketone was filtered from the plastic which contained approximately 2.5 percent of dissolved ketone. The 47.5 grams of ketone-containing plastic was added to a liquid dispersing medium containing 68.5 grams of di-isobutyl ketone, and 156 grams of xylene. The suspension was placed in a quart pebble mill containing 450 cc. of flint pebbles and rotated for 48 hours. The dispersion dries to a white powdery material which forms a continuous film when heated to 380° C. to 400° C. for fifteen seconds. After two or three applications, a continuous coating providing excellent chemical resistance to glass and good electrical insulation to metal is obtained.

EXAMPLE V

A dispersion similar to that of Example I was employed in this example to coat copper wire. In order to obtain complete coverage on the copper wire, it was necessary to dip the wire three times, allowing the particle film to be heated to 150° C. for fifteen seconds between successive dips. After the third dip, the wire was inserted into a furnace at 390° C. for short periods of 20–30 seconds until the particles appeared to be fused without evidence of decomposition. This cycle of multiple dipping and heating followed by fusion after every third dip was repeated three times and the wire was electrically insulated. At this stage, a diameter increase of 2.6 mils was measured which represents a film thickness of 1.3 mils assuming the wire was coated uniformly. The film showed no evidence of cracking after bending the wire sharply several times. It seems likely that better coverage of the copper wire with the resulting decrease in the number of dipping operations required to obtain a film thickness of 1-2 mils can be accomplished by increasing the viscosity of the dispersion.

EXAMPLE VI

About 45 grams of 240 N. S. T. polytrifluorochloroethylene plastic (through 80 mesh screen) was added with stirring to a liquid dispersing medium containing 71 grams of di-isobutyl ketone and 156 grams of xylene. The suspension was poured into a one quart pebble mill contaniing 450 cc. of flint pebbles and rotated at approximately 75 R. P. M. for 85 hours. This dispersion, containing 16.5 percent plastic, flowed readily and gave complete visual coverage of a metal or glass surface whether applied by spraying, dipping or drawing on the object coated. The dispersion dries to a white powdery material which forms a continuous film when heated to 375° C. to 390° C. for fifteen seconds. The above procedure gave a continuous film from 0.1 mil to about 0.3 mil in thickness.

EXAMPLE VII

About 199 grams of 314 N. S. T. polytrifluorochloroethylene plastic (through 80 mesh screen) was added with stirring to a thinner comprised of 176.3 grams of di-isobutyl ketone (dispersant) and 800 grams of xylene (diluent). The suspension, containing 16.8 percent plastic, was poured into a one gallon pebble mill containing flint pebbles half filling the mill. The liquid just covered the pebbles. The mill was rotated at approximately 75 R. P. M. for 96 hours, at the end of which time the plastic was colloidally dispersed in the suspension medium. An additional 45.3 grams of plastic was added to the mill (total of 20 percent plastic) and the mill operated for 48 hours. The free-flowing colloidally dispersed plastic gave good coverage to metal and glass surfaces when the latter were dipped into the dispersion. After air-drying, the plastic particles were fused to a continuous film by heating to 390–415° C. for from fifteen seconds to one minute.

Addition of sufficient plastic in the above example to make the total concentration 23 percent and 48 hours of pebble milling produced a dispersion which exhibited thixotropic properties. Due to the buttery gel-like nature of the product, it is difficult to apply to metal and glass surfaces.

EXAMPLE VIII

About 260 grams of polytrifluorochloroethylene wax (M. P. 98° C.), 36 grams of 240 N. S. T. polytrifluorochloroethylene plastic, and 140 grams of xylene were placed in a quart size pebble mill and milled for 96 hours. The dispersion contained 67.9 percent total solids, and the ratio of plastic to wax was 12.88. Paper suitable for bottle cap liners was dipped into the dispersion, air-dried, and heated to 200° C. for a short time. A continuous coating of wax plastic approximately 1 mil thick was formed on the surface of the paper and imparted water-vapor impermeability, gas impermeability, flame resistance, resistance to chemicals, etc., to the paper.

EXAMPLE IX

About 150 grams of polytrifluorochloroethylene wax (M. P. 98° C.), 50 grams of 240 N. S. T. polytrifluorochloroethylene plastic, and 238 grams of xylene were placed in a quart size pebble mill and milled for 96 hours. The resulting dispersion contained 45.6 percent total solids and a plastic to wax ratio of 25:75. The dispersion was sprayed onto tin coated iron and fused at 200° C. for five minutes. A continuous 2 mil protective coating was formed.

EXAMPLE X

About 60 grams of polytrifluorochloroethylene wax (M. P. 70° C.), 60 grams of 300 N. S. T. polytrifluorochloroethylene plastic, and 275 grams of xylene were placed in a quart size pebble mill and milled for 96 hours. The resulting dispersion contained 30 percent total solids and a plastic to wax ratio of 1:1. The dispersion was brushed onto aluminum surfaces, air-dried, and fused at 235° C. for five minutes. A hard well-adhering protective film was formed on the aluminum.

In the above Examples VIII, IX and X substantially all of the wax was dissolved in the xylene. The percent solids in the dispersion, therefore, represents both undissolved plastic and dissolved wax.

EXAMPLE XI 46.2 grams of 300 N. S. T. polytrifluorochloroethylene plastic (screen analysis indicated 66 percent through 80 mesh) was added with stirring to a thinner consisting of 41 grams of butyl acetate and 186 grams of xylene. This suspension was charged to a quart size ball-mill jar containing approximately 450 mils of flint pebbles and rotated for 139 hours. To this excellent dispersion was added 10.2 grams of 300 N. S. T. plastic and milling continued for 96 additional hours. The resultant dispersion (20 percent plastic) was too viscous for adequate film deposition by dipping and was diluted with stirring by the addition of 12.8 grams of butyl acetate and 57.9 grams of xylene. The final dispersion (16 percent KEL–F) deposited an even film of KEL–F particles which fused to a continuous coat at 380° C. to 400° C.

EXAMPLE XII 46.2 grams of 300 N. S. T. polytrifluorochloroethylene plastic (screen analysis indicated 66 percent through 80 mesh) was added with stirring to a thinner consisting of 41 grams of methyl isobutylketone and 186 grams of xylene. This suspension was charged to a quart size pebble-mill jar containing approximately 450 mils of flint pebbles and rotated for 139 hours. To this dispersion was added 10.5 grams of the 300 N. S. T. plastic and milling continued for 47 hours. The resultant dispersion (20 percent plastic) was excellent. The final dispersion deposited an even film of plastic polytrifluorochloroethylene particles which fused at 380° C. to 400° C.

EXAMPLE XIII

About 46 grams of 300 N. S. T. polytrifluorochloroethylene plastic (screen analysis indicated 66 percent through 80 mesh) was added with stirring to a thinner consisting of 41 grams of 2,ethoxy-ethanol,1 and 186 grams of xylene. This suspension was charged to a quart size pebble-mill jar containing approximately 450 mils of flint pebbles and rotated for 139 hours. To this dispersion was added 10.5 grams of the 300 N. S. T. plastic and milling continued for 47 hours. The resultant dispersion (20 percent plastic) was excellent but was slightly more viscous than desirable, depositing a thick film upon dipping. 4.5 grams of xylene and 1 gram of 2,-ethoxyethanol,1 were added, and milling continued for 28 hours. The final dispersion (19.6 percent plastic) deposited an even film of plastic polytrifluorochloroethylene particles which fused at 380° C. to 400° C.

Copper wire was coated with thin films of polytrifluorochloroethylene plastic by means of dispersions of suitable viscosities and a Hytron unit which is used in the wire coating field for preliminary evaluation of wire insulating materials prior to tests in commercial wire coating units. The Hytron unit consists of a baking oven, approximately 21 inches in length, which can be heated to a maximum temperature of 1000° C., of two applicators which are located within about 8 inches of either end of the oven and which can be used separately or in combination, and of conventional apparatus for regulating the speed of the wire through the oven and for guiding the wire for multiple coating. Recycling the wire back and forth through the applicators and the oven is to build up the wall thickness.

The wire, A. W. G. No. 28, was coated at various rates from 2 ft./min. at 400° C. to 20 ft./min. at 720° C. The temperatures recorded were the air temperatures of the oven. The time in the oven varied from approximately 53 seconds at the low rate to 5 seconds at the high rate.

By multiple coating it is possible to build up coatings 5 mils (0.005 inch) or more in thickness; by increasing the viscosity of the dispersion, i. e., by increasing the plastic concentration, fewer applications are required. For example, wire was coated with a film 1 mil thick by passing the wire 8 times through a single applicator containing a 20 percent plastic dispersion, with and without a plasticizer. When the concentration of the dispersion was adjusted to 30 percent plastic, only 4 passes through a single applicator were required. Both of these coatings used a wire rate of 14 ft./min., oven temperature of 600° C., and the wire remained in the oven 7.6 seconds per pass.

The thin polytrifluorochloroethylene plastic coatings possessed good mechanical and electrical properties and good chemical resistance.

Paper, fabric, and ceramic sheets coated with trifluorochloroethylene polymers are used as jackets for the insulation of wire and cable. The fabrics or papers are applied in the form of tapes, sheets, or braids. For high temperature resistance insulators the straight polytrifluorochloroethylene plastic dispersion is used to coat the wrapping. Polytrifluorochloroethylene wax-plastic dispersions may be used in applications where high temperature resistance is not needed. A final polytrifluorochloroethylene coat may be placed over the wrapped wire, if desirable.

The dispersions may be used to coat individual or multiple strands in lengths or on windings directly by dip or spray methods followed by fusion at elevated temperatures. These dispersions are of particular value because they permit a ratio of the film dielectric strength to film thickness higher than that of other insulating materials. Also of value are the excellent electrical characteristics, low moisture absorption, and good chemical resistance of the polytrifluorochloroethylene coating. A specific example is coating of copper magnet wire for motor armatures and generators.

The dispersions may be used as saturants for the treatment of asbestos braids (plus fusion treatment) employed on a number of small power cables, switchboard, and stove wires.

Dispersions of polytrifluorochloroethylenes are particularly useful in thin-walled electrical insulation, coating of electrical assemblies such as condensers, resistors, and the like, requiring low moisture absorption and high heat distortion point.

Protection of metal against the various service conditions to which it may be exposed is solved in numerous cases by coating the exposed surface with polytrifluorochloroethylene applied from dispersion. A specific example is the coating of large gate valves made of steel. The valves are to be used in a highly corrosive acid solution at 80–90° C. The surface of the metal to be coated is pretreated by solvent dip followed by mild pickling in order to obtain optimum adhesion of the polytrifluorochloroethylene film. A 20 percent plastic dispersion is passed over the surface to be coated and the coated valve drained, air-dried and fused for two minutes at 390° C. This operation is repeated in order to make certain that no exposed surfaces remain. The resulting continuous film had a thickness of 1.5 mils and successfully protected the gate valve from corrosion. Another example is the coating of the inside of an aluminum tank with polytrifluorochloroethylene wax-plastic dispersion so that it will withstand the action of white-fuming and dilute nitric acid and vapors at temperatures up to 80° C. The tank is partially filled with the polytrifluorochloroethylene wax-plastic dispersion, rotated to completely wet the internal surface, drained, dried by passing a warm inert gas into the tank, and fused at 200° C. for ten minutes. This operation is repeated two more times and a continuous non-porous film 1 mil thick built up which meets the desired specification.

The above wax-plastic dispersion is especially suited for the coating of cans. A fusion temperature of 200° C. for ten minutes is suitable in the can coating industry and this inert film formed does not impart odor, color, or taste to the can ingredients.

The dispersion is deposited on the surface of the metal to be used in making cans by means of conventional roller coating techniques.

The present invention includes within its scope polymers of trifluorochloroethylene which include a minor amount of other monomers, such as vinyl chloride, tetrafluoroethylene, perfluoropropene and acrylonitriles. The use of these other monomers is limited to less than about 15 percent of the polymer. In some instances it is desirable to use small quantities of other monomers in combination with the principal monomer trifluorochloroethylene in order to impart modified characteristics to the resulting polymer.

We claim:

1. A dispersion which comprises finely-divided particles of the plastic homopolymer of trifluorochloroethylene and an added waxy polymer of trifluorochloroethylene as a plasticizer dispersed in a liquid dispersing medium comprising di-isobutly ketone and xylene.

2. The method for preparing a dispersion of the plastic homopolymer of trifluorochloroethylene which comprises admixing the plastic homopolymer of trifluorochloroethylene and an added polymer of trifluorochloroethylene having a molecular weight no higher than that of the waxy polymer as a plasticizer with a ketone having at least three carbon atoms per molecule as a dispersant and xylene as a diluent and milling the plastic polymer while in admixture with the ketone and xylene for at least 24 hours to form a dispersion.

3. The method for preparing a dispersion of a plastic polymer of trifluorochloroethylene containing less than 15 percent of an ethylenically unsaturated compound other than trifluorochloroethylene as a comonomer therein which comprises admixing said plastic polymer of trifluorochloroethylene and an added polymer of trifluorochloroethylene having a molecular weight no higher than that of the waxy polymer as a plasticizer with an organic dispersing medium comprising at least one compound selected from the group consisting of ether alcohols and ketones and milling the plastic polymer while in admixture with said organic dispersing medium to form a dispersion.

4. A dispersion which comprises a plastic homopolymer of trifluorochloroethylene and an added waxy polymer of trifluorochloroethylene as the plasticizer dispersed in a liquid organic dispersing medium comprising at least one compound selected from the group consisting of ether alcohols and ketones.

5. A liquid suspension comprising (1) a dispersed phase consisting essentially of finely divided solid, high molecular weight polychlorotrifluoroethylene as the sole polymeric ingredient in the solid state and (2) a dispersion medium for (1) comprising (a) a low molecular weight liquid polymer of chlorotrifluoroethylene and (b) an aliphatic ketone having at least three carbon atoms per molecule.

6. A liquid suspension comprising (1) a dispersed phase consisting essentially of finely divided solid, high molecular weight polychlorotrifluoroethylene as the sole polymeric ingredient in the solid state and (2) a dispersion medium for (1) comprising (a) a low molecular weight liquid polymer of chlorotrifluoroethylene and (b) a ketone.

7. A dispersion which comprises a plastic polymer containing more than 85 percent of the monomer trifluorochloroethylene and containing less than about 15 percent of an ethylenically unsaturated compound other than trifluorochloroethylene as a comonomer therein, an added waxy polymer of trifluorochloroethylene as a plasticizer, dispersed in a liquid organic dispersing medium comprising as a dispersant at least one compound selected from the group consisting of the ether alcohols and the ketones.

8. A dispersion which comprises a plastic polymer of trifluorochloroethylene containing less than about 15 percent of an ethylenically unsaturated compound other than trifluorochloroethylene as a comonomer therein and a plasticizer selected from the group consisting of liquid and waxy polymers of trifluorochloroethylene, dioctyl phthalate and tricresyl phosphate dispersed in a liquid medium comprising as a dispersant at least one compound selected from the group consisting of ether alcohols and ketones.

9. A dispersion which comprises a plastic polymer of trifluorochloroethylene containing less than about 15 percent of an ethylenically unsaturated compound other than trifluorochloroethylene as a comonomer therein and an added polymer of trifluorochloroethylene having a molecular weight no higher than that of the waxy polymer as a plasticizer dispersed in a liquid medium comprising as a dispersant at least one compound selected from the group consisting of ether alcohols and ketones.

10. A dispersion which comprises a plastic polymer of trifluorochloroethylene containing less than about 15 percent of an ethylenically unsaturated compound other than trifluorochloroethylene as a comonomer therein and an added polymer of trifluorochloroethylene having a molecular weight no higher than that of the waxy polymer as a plasticizer dispersed in a liquid organic dispersing medium comprising at least one compound selected from the group consisting of ether alcohols and ketones, the concentration of plastic in the dispersion being between about 10 and about 30 percent by weight and the concentration of plasticizer in the dispersion being between about 10 and about 25 percent by weight.

11. A dispersion which comprises a plastic polymer of trifluorochloroethylene containing less than about 15 percent of an ethylenically unsaturated compound other than trifluorochloroethylene as a comonomer therein and an added polymer of trifluorochloroethylene having a molecular weight no higher than that of the waxy polymer as a plasticizer dispersed in a liquid medium comprising an organic dispersant and an organic diluent, said dispersant comprising at least one compound selected from the group consisting of ether alcohols and ketones, the concentration of plasticizer in the dispersion being between about 10 and about 25 percent by weight, the weight ratio of dispersant to diluent being between about 1 to 2 and about 1 to 25 and the viscosity of the dispersion being less than about 130 centipoises.

12. A dispersion which comprises a plastic polymer of trifluorochloroethylene containing less than about 15 percent of an ethylenically unsaturated compound other than trifluorochloroethylene as a comonomer therein and an added waxy polymer of trifluorochloroethylene as a plasticizer dispersed in a liquid organic dispersing medium comprising at least one compound selected from the group consisting of ether alcohols and ketones.

13. A dispersion which comprises finely divided particles of the plastic polymer of trifluorochloroethylene containing less than about 15 percent of an ethylenically unsaturated compound other than trifluorochloroethylene as a comonomer therein and an added waxy polymer of trifluorochloroethylene as a plasticizer dispersed in diisobutyl ketone.

14. A dispersion which comprises finely divided particles of the plastic polymer of trifluorochloroethylene containing less than about 15 percent of an ethylenically unsaturated compound other than trifluorochloroethylene as a comonomer therein and an added polymer of trifluorochloroethylene having a molecular weight no higher than that of the waxy polymer as a plasticizer dispersed in methyl isobutyl ketone.

15. A dispersion which comprises finely divided polymers of the plastic polymer of trifluorochloroethylene containing less than about 15 percent of an ethylenically unsaturated compound other than trifluorochloroethylene as a comonomer therein and an added polymer of trifluorochloroethylene having a molecular weight no higher than that of the waxy polymer as a plasticizer dispersed in xylene.

16. A dispersion which comprises finely divided particles of the plastic polymer of trifluorochloroethylene containing less than about 15 percent of an ethylenically unsaturated compound other than trifluorochloroethylene as a comonomer therein and an added polymer of trifluorochloroethylene having a molecular weight no higher than that of the waxy polymer as a plasticizer dispersed in methoxy ethanol.

17. The method of preparing a dispersion of the plastic polymer of trifluorochloroethylene containing less than about 15 percent of an ethylenically unsaturated compound other than trifluorochloroethylene as a comonomer therein and a plasticizer selected from the group consisting of liquid and waxy polymers of trifluorochloroethylene, dioctyl phthalate and tricresyl phosphate with an organic dispersing medium comprising at least one compound selected from the group consisting of ether alcohols and ketones and pulverizing the plastic polymer while in admixture with the dispersing medium for at least twenty-four hours to form a dispersion.

References Cited in the file of this patent

UNITED STATES PATENTS

| | | |
|---|---|---|
| 2,484,483 | Berry | Oct. 11, 1949 |
| 2,510,078 | Compton et al. | June 6, 1950 |
| 2,581,454 | Sprung | Jan. 8, 1952 |